(12) United States Patent
Uchida et al.

(10) Patent No.: US 7,667,743 B2
(45) Date of Patent: Feb. 23, 2010

(54) RECORDING APPARATUS

(75) Inventors: Yoshihide Uchida, Hino (JP); Tatsuhiko Ikehata, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 412 days.

(21) Appl. No.: 11/517,416

(22) Filed: Sep. 8, 2006

(65) Prior Publication Data

US 2007/0064114 A1 Mar. 22, 2007

(30) Foreign Application Priority Data

Sep. 16, 2005 (JP) ............................ 2005-270886

(51) Int. Cl.
H04N 5/76 (2006.01)

(52) U.S. Cl. ................................. 348/231.99

(58) Field of Classification Search ............ 348/208.99, 348/208.3, 231.99, 208.16, 231.2, 231.9; 369/44.32, 44.33, 53.12, 53.18; 386/1, 45, 386/46, 125, 126
See application file for complete search history.

(56) References Cited

U.S. PATENT DOCUMENTS

| | | | |
|---|---|---|---|
| 5,982,573 A * | 11/1999 | Henze | 360/75 |
| 6,169,574 B1 * | 1/2001 | Noguchi et al. | 348/208.16 |
| 6,178,058 B1 * | 1/2001 | Pan et al. | 360/60 |
| 6,520,013 B1 * | 2/2003 | Wehrenberg | 73/489 |
| 6,590,607 B1 * | 7/2003 | Taussig | 348/208.4 |
| 6,735,033 B1 * | 5/2004 | Codilian et al. | 360/60 |
| 6,771,449 B1 * | 8/2004 | Ito et al. | 360/75 |
| 7,190,540 B2 * | 3/2007 | Matsumoto | 360/60 |
| 7,191,089 B2 * | 3/2007 | Clifford et al. | 702/141 |
| 7,212,360 B2 * | 5/2007 | Nagai et al. | 360/6 |
| 2004/0146274 A1 * | 7/2004 | Ishibashi | 386/46 |

FOREIGN PATENT DOCUMENTS

| | | |
|---|---|---|
| JP | 2000-268479 | 9/2000 |
| JP | 2002-008336 | 1/2002 |
| JP | 2003-346444 | 12/2003 |

* cited by examiner

*Primary Examiner*—Lin Ye
*Assistant Examiner*—Chriss S Yoder, III
(74) *Attorney, Agent, or Firm*—Pillsbury Winthrop Shaw Pittman, LLP

(57) ABSTRACT

Based on a detection signal from a drop sensor, it is determined whether or not an apparatus is actually dropping. When the apparatus is determined to be dropping, access to a HDD for recording or reading is forbidden, while when the apparatus is determined not to be dropping, the access is allowed. When the access is allowed, a process which is performed immediately before the access is forbidden is resumed.

3 Claims, 8 Drawing Sheets

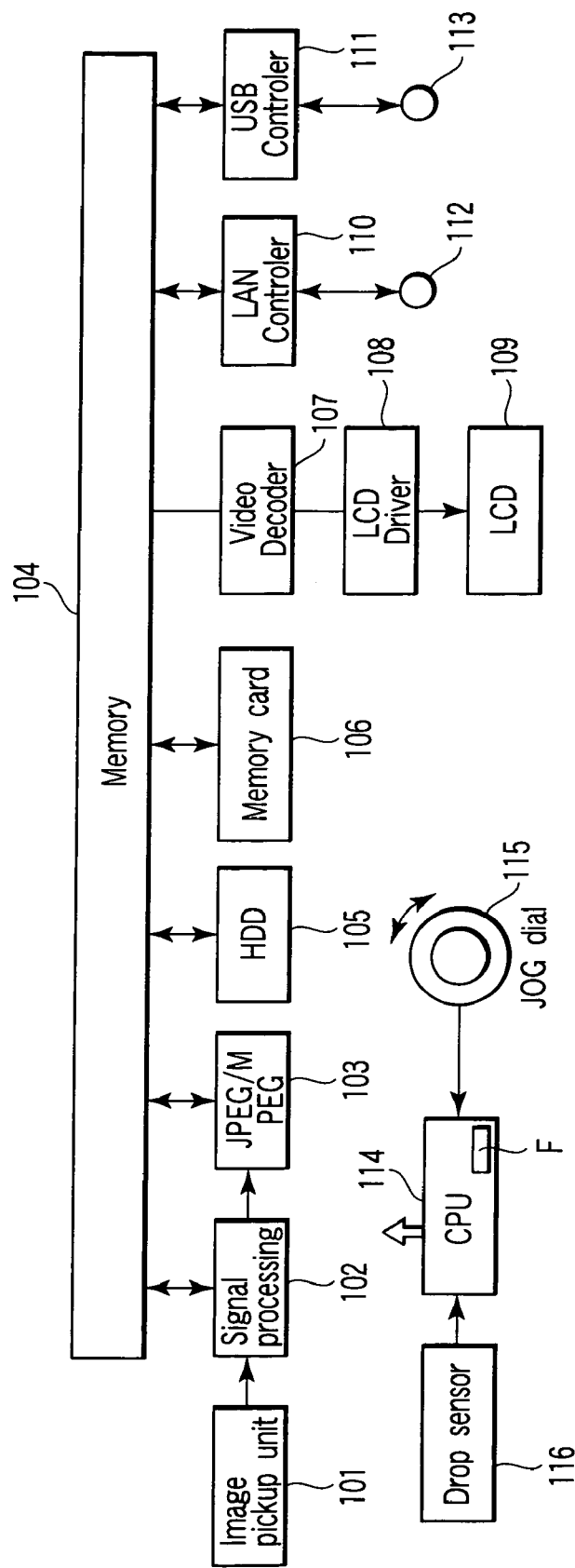
F I G. 1

RECORDING APPARATUS

CROSS-REFERENCE TO RELATED APPLICATIONS

This application is based upon and claims the benefit of priority from Japanese Patent Application No. 2005-270886, filed Sep. 16, 2005, the entire contents of which are incorporated herein by reference.

BACKGROUND

1. Field

The present invention relates to an image pickup apparatus that compresses image data obtained by shooting and records the image data on a recording medium.

2. Description of the Related Art

An image pickup apparatus such as a digital camera can mount a portable recording medium such as a memory card composed of a semiconductor memory. A shot image can be stored in the memory card. By user operation, image data stored in the memory card is read and an image is displayed on a liquid crystal display unit installed on the camera.

Recently, a digital camera that mounts a hard disk drive (HDD) which is a large-capacity recording medium has been developed. In such a camera, the number of still images that can be recorded and the recording time for a moving image are dramatically increased over conventional digital cameras.

However, the HDD is susceptible to impact, and thus by dropping of the camera, the HDD itself may be damaged or data may be corrupted. Jpn. Pat. Appln. KOKAI Publication No. 2003-346444 discloses a disk apparatus in which when a free-fall condition of a camera is detected, a head is retracted from a disk to protect the head and the optical disk.

When dropping of the apparatus is detected on the ground, a process that is performed just before the dropping is aborted in the aforementioned Jpn. Pat. Appln. KOKAI Publication No. 2003-346444. However, there is no description of a process after that. Specifically, there is no description of a process of, after the apparatus is dropped, returning the apparatus to an operation state before the dropping.

BRIEF DESCRIPTION OF THE SEVERAL VIEWS OF THE DRAWINGS

A general architecture that implements the various feature of the invention will be described with reference to the drawings. The drawings and the associated descriptions are provided to illustrate embodiments of the invention and not to limit the scope of the invention.

FIG. 1 is a block diagram showing a schematic configuration of a digital camera to which the present invention is applied;

FIG. 9 is a flowchart showing a process of writing shot data when access to the recording apparatus occurs during shooting with the drop flag being ON;

DETAILED DESCRIPTION

Figure 2:
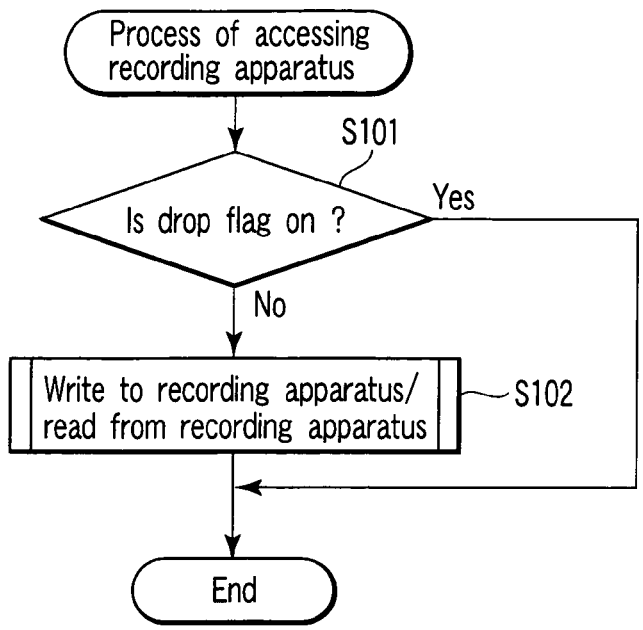
FIG. 2 is a flowchart showing a basic operation of the present invention.

Various embodiments according to the invention will now be described hereinafter with reference to the accompanying drawings. In general, according to one embodiment of the invention, there is provided an image pickup apparatus which records image data obtained by shooting, the apparatus comprising: an image pickup unit which picks up an optical image and provides image data corresponding to the optical image; a recording unit which records the image data obtained by the image pickup unit; a determination unit which determines whether or not the apparatus is dropping; and an access control unit which forbids access to the recording unit for recording or reading when the apparatus is determined by the determination unit to be dropping, and allows the access when the apparatus is determined not to be dropping.

FIG. 1 is a block diagram showing a schematic configuration of a digital camera which serves as an image pickup apparatus to which the present invention is applied. An image pickup unit 101 includes an imaging lens, a CCD, and an A/D converter. The image pickup unit 101 picks up an optical image and provides image data corresponding to the optical image. The image data is recorded, as a compressed image signal, on a hard disk (HDD) 105 or in a memory card 106 composed of a nonvolatile semiconductor memory, via a camera signal processing circuit 102, a JPEG (for still images)/MPEG (for moving images) compression processing circuit 103, and a memory circuit 104. The memory card 106 is mounted in a card slot (not shown) and is a removable recording medium. A shot image passes through an LCD driver 108 via a video decoder 107 and then is displayed on an LCD 109.

Upon playback, an image read from the HDD 105 or the memory card 106 passes through the LCD driver 108 via the JPEG (for still images)/MPEG (for moving images) decompression processing circuit 103, the memory circuit 104, and the video decoder 107, and then is displayed on the LCD 109.

When a still image or moving image recorded on the HDD 105 or in the memory card 106 is transferred to an external device or received from an external device, the image is transmitted or received by a USB terminal 113 via a USB controller 111. Here, it is assumed that the external device is a PC. In addition, without using a PC, an MPEG compressed moving image can be directly transmitted or received to/from an image recording and reproducing apparatus such as a DVD recorder. Generally, when such an image is transferred to a DVD recorder, an MPEG compressed moving image is decoded on the camera side, a signal in an analog format is outputted from a video terminal or an S terminal, and the analog signal is re-compressed and stored on the image recording and reproducing apparatus side. In this method, for example, recording of a one-hour long moving image on a DVD takes an hour. However, here, MPEG compressed moving image data can be transferred as it is to a DVD in a streaming mode through a network. Therefore, the transfer time can be several tens of times less than the actual time though it depends on the compression rate, and the image quality remains high because re-encoding is not performed. For example, for 1/10, recording a one-hour long moving image on a DVD recorder can be done in only six minutes. When the network is considered to be a LAN, data is transmitted or received to/from a LAN terminal 112 via a LAN controller 110. Note that in the transfer to the DVD recorder, not only a moving image but also a still image and a sound can be included.

As such, when the recording medium is the large-capacity HDD 105, the number of images to be recorded increases, and thus scrolling forward and backward through images require a high speed. To allow a user to perform such operations without causing stress, a JOG dial 115 is used. The JOG dial 115 provides information on the rotation angle and rotation speed thereof to a CPU 114 that controls the entire system. The CPU 114 controls the display speed of an image and the like based on such information.

A drop sensor 116 is a gravity sensor and determines a near zero-gravity state to be a drop. The drop sensor 116 determines detected gravity being 0.3 G or less, for example, to be a drop and outputs a low-level signal (L), for example. The CPU 114 performs processes according to the present invention, based on the detection signal.

In the present invention, when recording/reading is performed on a recording apparatus, a recording/reading operation is not accepted in a state in which a drop is detected, and the recording/reading operation is performed after being returned from the drop state. The HDD itself may be damaged or data may be corrupted even by a relatively weak impact. Particularly, by an impact, the head is likely to damage the hard disk. Thus, since the HDD is susceptible to impact during a recording/reading operation, access to the HDD is stopped when dropping of the camera is determined by the drop sensor. Consequently, the probability of damage to the HDD can be reduced.

The basic operation of the present invention is shown in FIG. 2. When accessing a recording apparatus (which indicates the HDD 105 in the present embodiment unless otherwise specifically described), the CPU 114 checks a drop flag F to determine whether or not the apparatus is dropping (S101). If the drop flag F is OFF ("NO" in S101), the CPU 114 determines that the apparatus is not dropping and thus allows access to the recording apparatus (S102). If the drop flag F is ON, the CPU 114 determines that the apparatus is dropping and thus forbids access to the recording apparatus. Note that if the CPU 114 verifies that the drop flag is ON while accessing the recording apparatus ("YES" in S101), the CPU 114 forbids the access and retracts the HDD head from the hard disk. If, after the drop, the CPU 114 verifies that the drop flag is OFF ("NO" in S101), the CPU 114 resumes the access that is performed immediately before the drop flag being ON is verified (S102).

Figure 3:
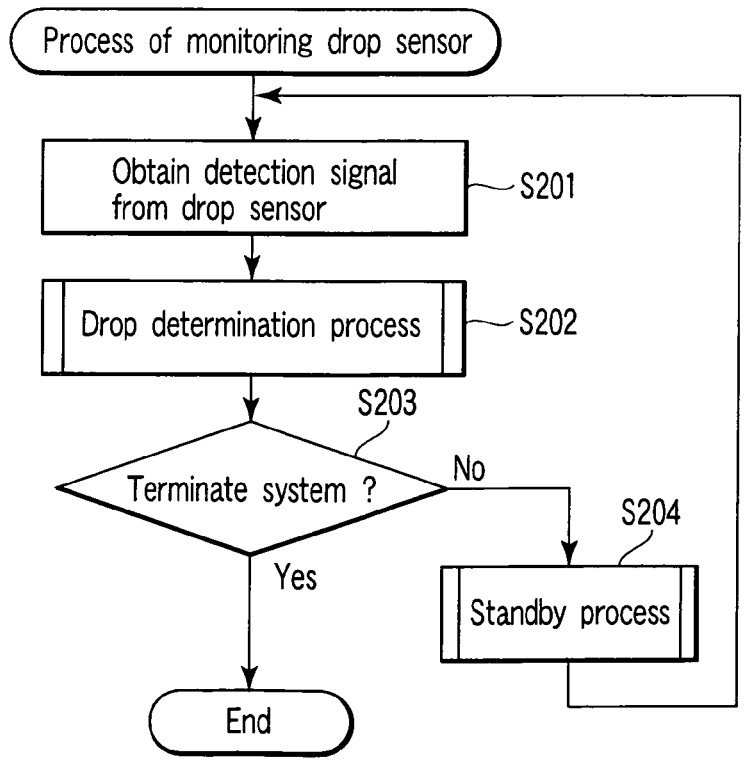
FIG. 3 is a flowchart showing a drop sensor monitoring process.

FIG. 3 shows a process of determining a drop by monitoring an output detection signal from the drop sensor. The setting of a flag F which indicates a determination result of a drop is performed by an independent task. The CPU 114 obtains an output signal from the drop sensor (S201) and performs a drop determination process based on the signal (S202). In the drop determination process (S202), the drop flag F is set to ON when it is determined that the apparatus is actually dropping, while the drop flag F is set to OFF when it is determined that the apparatus is not dropping (the apparatus is returned from a drop state).

When a system termination process is performed (when the power is turned off), the CPU 114 ends the task (S203). If the system continues in use ("NO" in S203), the CPU 114 sets a waiting time (e.g., 10 mmS) (S204) and obtains again information from the drop sensor. In the standby process (S204), an interrupt timer is set and the CPU 114 performs other tasks. The other tasks include the aforementioned process of FIG. 2 and processes of FIGS. 8 to 11 which will be described later. When the waiting time set on the interruption timer has elapsed, an interruption occurs and the process by the CPU 114 proceeds to step S201.

Now, the drop determination process in step S202 will be described. The drop determination process is processed by an independent task.

Figure 4:
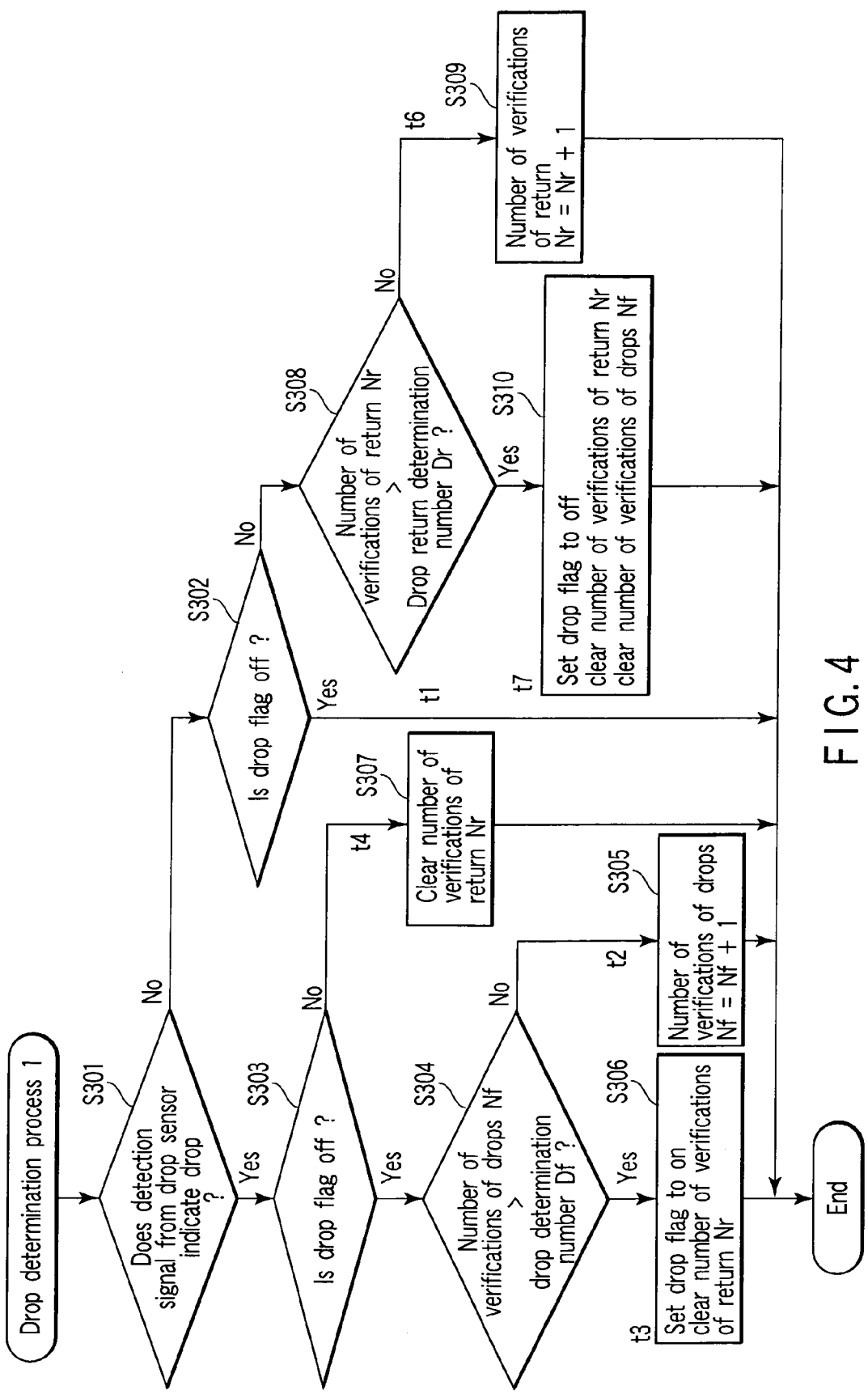
FIG. 4 is a flowchart showing a drop determination process 1 which is a drop determination process according to a first embodiment.
Figure 5:
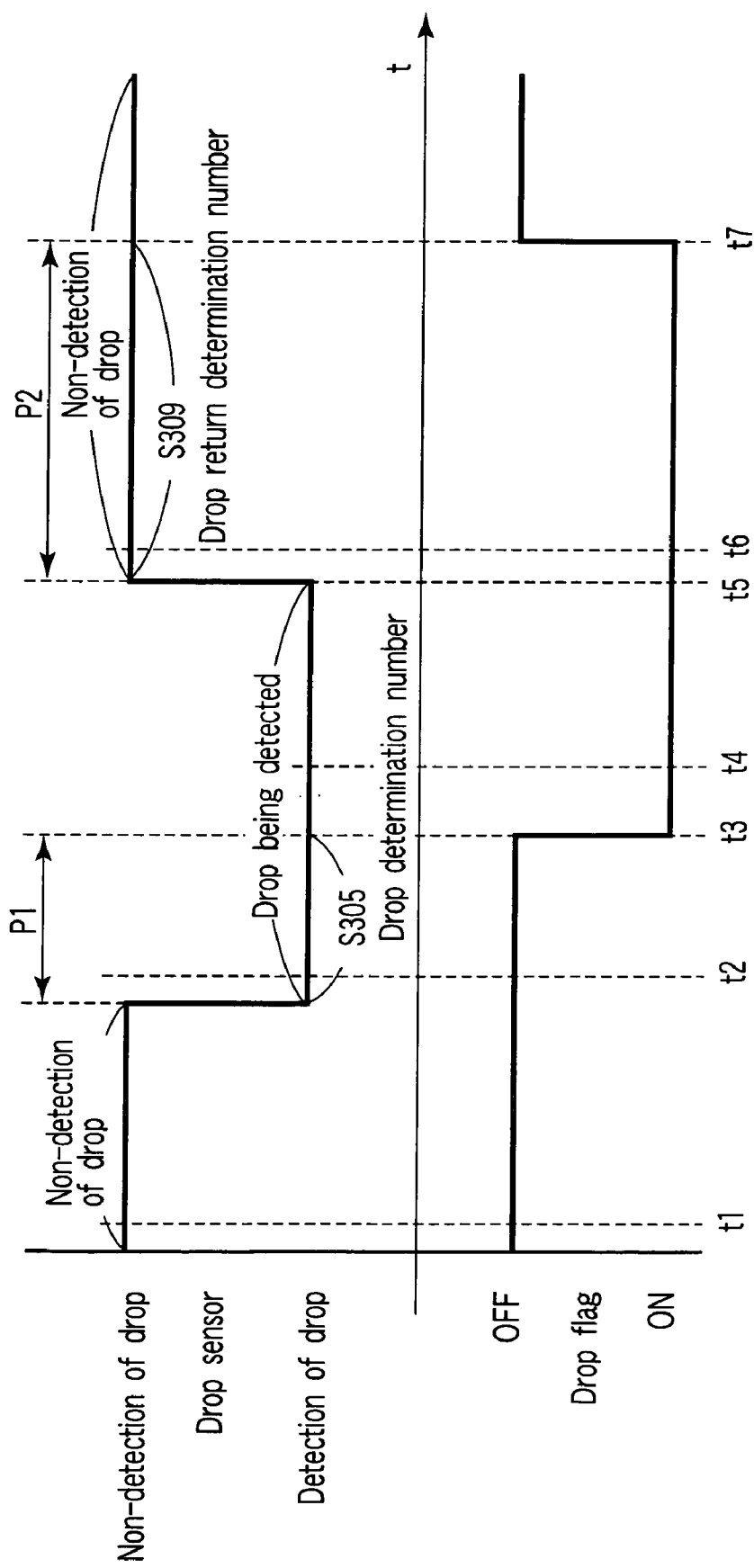
FIG. 5 is a diagram showing states of a drop sensor and a drop flag in the drop determination process 1.

FIG. 4 is a flowchart showing a drop determination process 1 which is a drop determination process according to a first embodiment, and FIG. 5 is a diagram showing the states of the drop sensor 116 and the drop flag F in the drop determination process 1.

The CPU 114 checks a detection signal from the drop sensor (S301), and if the detection signal indicates non-detection of a drop ("NO" in S302), the CPU 114 checks the state of the drop flag (S302). If the drop flag is OFF, as shown at time t1, the CPU 114 does nothing.

The CPU 114 checks a detection signal from the drop sensor (S301), and if the signal indicates a drop ("YES" in S301), the CPU 114 checks the current state of the drop flag (S303). If the drop flag is OFF ("YES" in S303), the CPU 114 compares the number of verifications of drops (the number of times drops are continuously verified) Nf with a drop determination number (a reference value to determine a drop) Df (S304). As shown at time t2, if the number of verifications of drops Nf is less than or equal to the drop determination number Df ("NO" in S304), the CPU 114 increments the number of verifications of drops Nf by one (Nf=Nf+1) (S305). If the number of verifications of drops Nf is greater than the drop determination number Df ("YES" in S304), the CPU 114 sets, as shown at time t3, the drop flag to ON and clears the number of verifications of return Nr (described later) to zero (S306). If, as shown at time t4, the drop flag is ON ("NO" in S303), the CPU 114 clears the number of verifications of return to zero (S307).

If the detection signal from the drop sensor indicates non-detection of a drop ("NO" in S301) and the drop flag F is ON ("NO" in S302), the CPU 114 compares the number of verifications of return (the number of times non-detections of a drop are continuously verified) Nr with a return determination number (a reference value to determine return from a drop) Dr (S308). As shown at t6, if the number of verifications of return Nr is less than or equal to the drop return determination number Dr ("NO" in S308), the CPU 114 increments the number of verifications of return Nr by one (Nr=Nr+1) (S309). If the number of verifications of return Nr is greater than the drop return determination number Dr ("YES" in S308), the CPU 114 sets, as shown at time t7, the drop flag to OFF and clears the number of verifications of return Nr to zero and the number of verifications of drops Nf to zero (S310). Note that at time t5, the apparatus receives an impact by a drop.

As described above, a determination as to whether or not the apparatus is actually dropping is made by the CPU 114, based on a detection signal from the drop sensor 116. Specifically, when the drop sensor 116 indicates continuous detection of a drop for a first predetermined period of time P1, the CPU 114 determines that the apparatus is dropping and thus sets the drop flag to ON. When the drop sensor 116 indicates continuous non-detection of a drop for a second predetermined period of time P2, the CPU 114 determines that the apparatus is not dropping and thus sets the drop flag to OFF.

If the same drop return determination number Dr is uniformly used in determining return from a drop state, it takes time to return from a drop due to an influence of noise generated during a drop return determination. By using, as the drop return determination number Dr, a smaller value than that used previously, the time up to the return can be reduced under conditions where a sufficient period in which access to a storage media is forbidden is provided. An embodiment for reducing the time up to the return will be described below.

Figure 6:
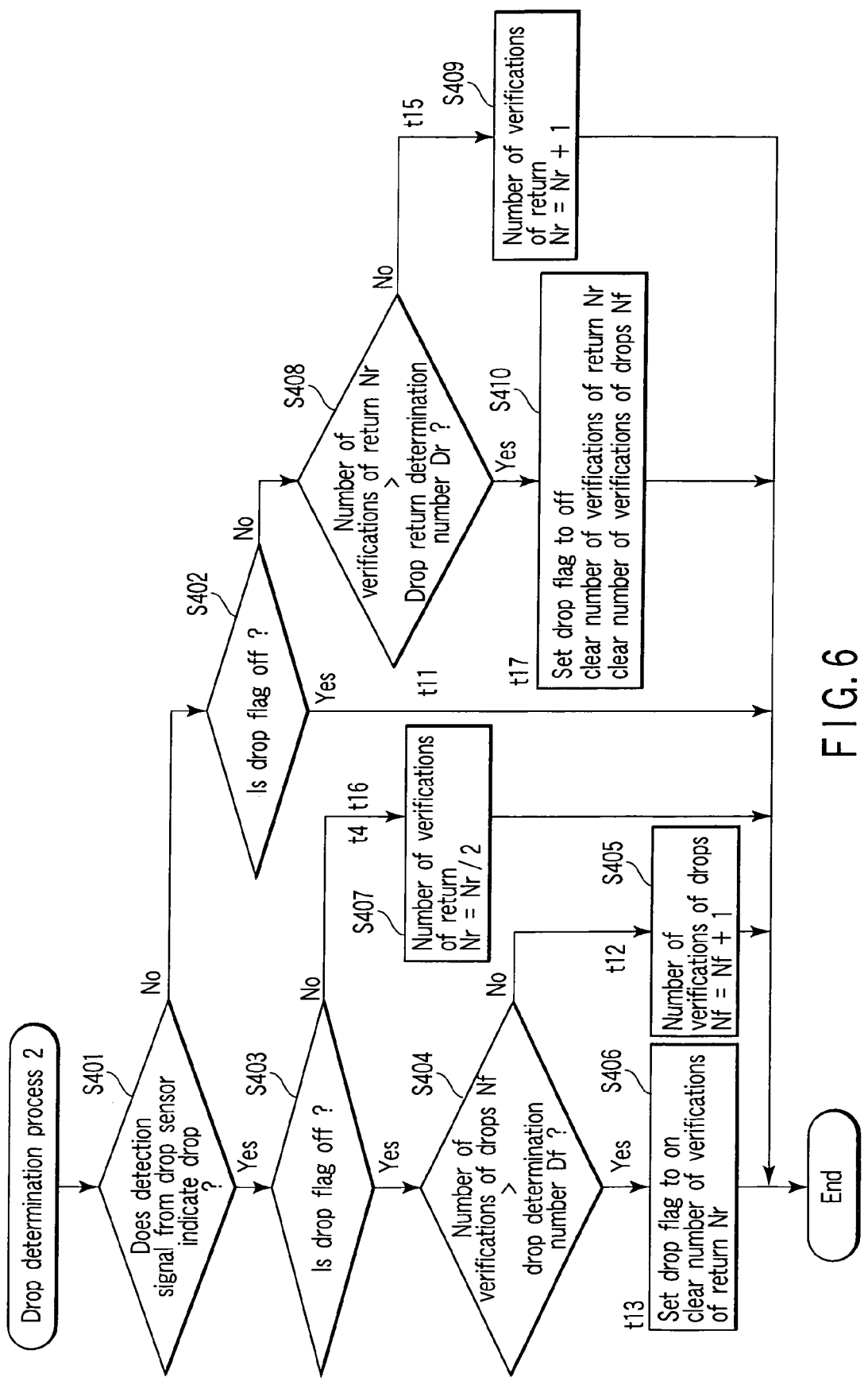
FIG. 6 is a flowchart showing a drop determination process 2 which is a drop determination process according to a second embodiment.
Figure 7:
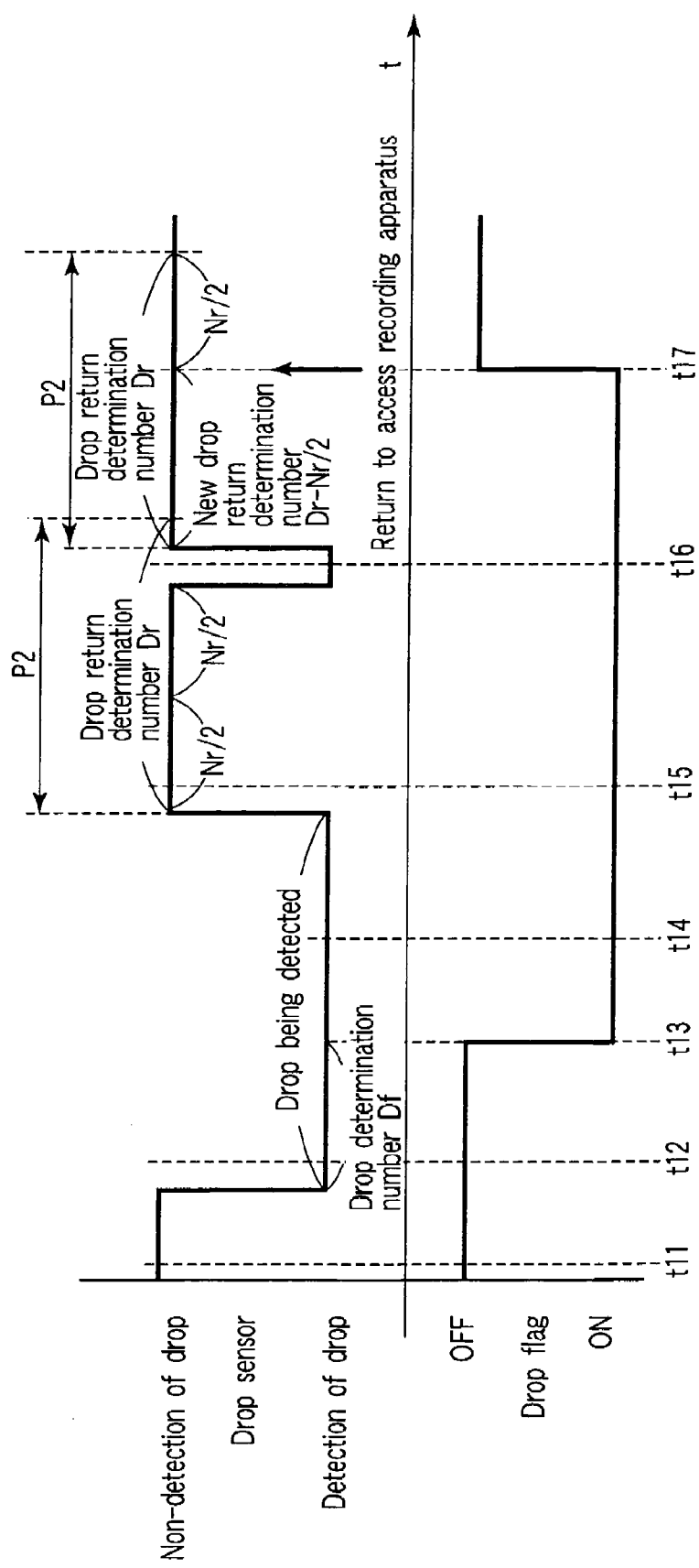
FIG. 7 is a diagram showing states of a drop sensor and a drop flag in the drop determination process 2.

FIG. 6 is a flowchart showing a drop determination process 2 which is a drop determination process according to a second embodiment, and FIG. 7 is a diagram showing the states of the drop sensor 116 and the drop flag F in the drop determination process 2.

The CPU 114 checks a detection signal from the drop sensor (S401), and if the detection signal indicates non-detection of a drop, the CPU 114 checks the state of the drop flag (S402). If, as shown at time t11, the drop flag is OFF, the CPU 114 does nothing.

The CPU 114 checks a detection signal from the drop sensor (S401), and if the signal indicates a drop ("YES" in S401), the CPU 114 checks the current state of the drop flag (S403). If the drop flag is OFF ("YES" in S403), the CPU 114 compares the number of verifications of drops Nf with a drop determination number Df (S404). As shown at time t12, if the number of verifications of drops Nf is less than or equal to the drop determination number Df ("NO" in S404), the CPU 114 increments the number of verifications of drops Nf by one (Nf=Nf+1) (S405). If the number of verifications of drops Nf is greater than the drop determination number Df ("YES" in S404), the CPU 114 sets, as shown at time t13, the drop flag to ON and clears the number of verifications of return Nr to zero (S406). If, as shown at time t14, the drop flag is ON ("NO" in S403), the CPU 114 reduces the number of verifications of return to half (Nr=Nr/2), as will be described later (S407).

If the detection signal from the drop sensor indicates non-detection of a drop ("NO" in S401) and the drop flag is ON ("NO" in S402), the CPU 114 compares the number of verifications of return (the number of times non-detections of a drop are continuously verified) Nr with a drop return determination number (a reference value to determine return) Dr (S408). As shown at t15, if the number of verifications of return Nr is less than or equal to the drop return determination number Dr ("NO" in S408), the CPU 114 increments the number of verifications of return Nr by one (Nr=Nr+1) (S409).

Then, as shown at time t16, if noise is incorporated in a detection signal from the drop sensor 116 or if the drop sensor misdetects, the detection signal from the drop sensor indicates detection of a drop (L-level signal) with the drop flag being ON. This state is the state of "NO" in step S403 and also corresponds to the state of "NO" in step S303 in the drop determination process 1 of FIG. 4. If, each time such noise is incorporated, the number of verifications of return Nr is cleared as shown in step S307 of FIG. 4, the number of computation processes in step S309 increases. As a result, it requires a long time for the apparatus to be returned to a normal operation state from a drop state.

In view of this, the present embodiment employs the following configuration. That is, when, as shown at t16, a detection signal from the drop sensor 116 indicates detection of a drop (L-level signal) before the number of verifications of return Nr reaches the drop return determination number Dr, the CPU 114 reduces the number of verifications of return Nr obtained at the time of t16 to half (Nr=Nr/2), as shown in step S407. As shown in FIG. 7, when the drop sensor goes into a state of non-detection of a drop immediately after time t16, the CPU 114 starts, in step S409, a computation of incrementing the Nr/2 by +1. Thus, the process in step S407 is equal to the change of the drop return determination number Dr to a new drop return determination number "Dr−Nr/2". As a result, the time from the state of detection of a drop at time t16 until the return state (drop flag: OFF) at time t17 can be reduced as compared with the case of the drop determination process 1 of FIG. 4. As such, according to the present embodiment, returning of the apparatus to a normal operation state cannot be significantly delayed even in circumstances where noise is incorporated in a detection signal from the drop sensor. In the state of time t14 as well, the number of verifications of return Nr is reduced to half as described above. However, at this time, the number of verifications of return Nr is cleared to zero at time t13, as shown in step S406, and thus, the drop determination process is not affected.

As described above, when, after the drop sensor 116 indicates non-detection of a drop and before a second predetermined period of time P2 has elapsed, the drop sensor 116 indicates detection of a drop as shown at time t16, and indicates, immediately after that, non-detection of a drop again, the CPU 114 determines, before a state indicating the non-detection of a drop again continues for a second predetermined period of time P2, that the apparatus is not dropping as shown at time t17, and sets the drop flag F to OFF.

Figure 8:
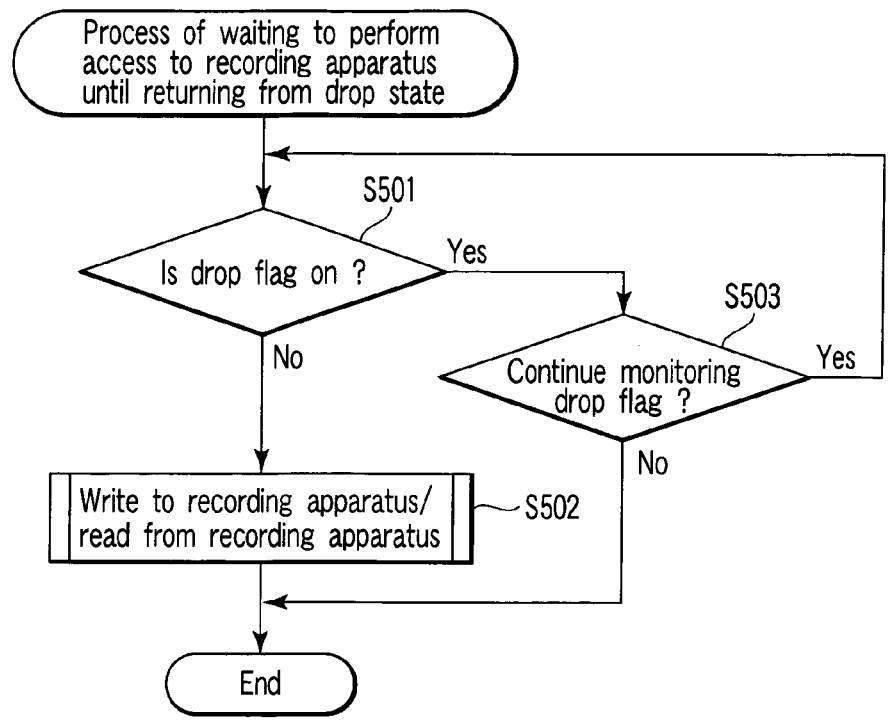
FIG. 8 is a flowchart showing a process in which when access to a recording apparatus occurs with the drop flag being ON, a standby state is maintained until a drop state is reset.

Now, the process of waiting for the access until a drop state is reset when access to the recording apparatus occurs with the drop flag being ON is shown is FIG. 8.

When accessing the recording apparatus, the CPU 114 checks the drop flag to determine whether or not a drop is detected (S501). If a drop is not detected, the CPU 114 accesses the recording apparatus (S502). If a drop is detected, the CPU 114 monitors the drop flag while checking an upper limit for avoiding an endless loop (S503). If the drop flag becomes OFF before reaching the upper limit, the CPU 114 accesses the recording apparatus.

Now, a process will be described with reference to FIG. 9, in which, when access to the recording apparatus occurs during shooting with the drop flag being ON, shot data is written once in a buffer and after a drop state is reset, writing to the recording apparatus is performed. Note that here the buffer indicates the memory 104 of FIG. 1.

When image data obtained by shooting is written to the recording apparatus, the CPU 114 checks the drop flag to determine whether or not the apparatus is dropping (S601). If the drop flag is ON ("YES" in S601), the CPU 114 checks whether or not there is buffer space available (S602). If there is buffer space available, the CPU 114 writes shot data in the buffer (S603). If the drop flag is OFF ("NO" in S601) and if there is data in the buffer ("YES" in S604), the CPU 114 first writes the data stored in the buffer to the recording apparatus (S605), and if there is no data in the buffer, the CPU 114 immediately performs writing to the recording apparatus (S606). If there is no buffer space available ("NO" in S602), the CPU 114 ends the process with error.

As such, in the case where there is data that the user essentially wants to write even in a state that access to the HDD is forbidden, such as the case of detection of a drop upon shooting a moving image, the data is accumulated in the buffer and the data accumulated in the buffer is written after an access forbidden state is reset. Consequently, the probability of data loss can be reduced.

Figure 9:
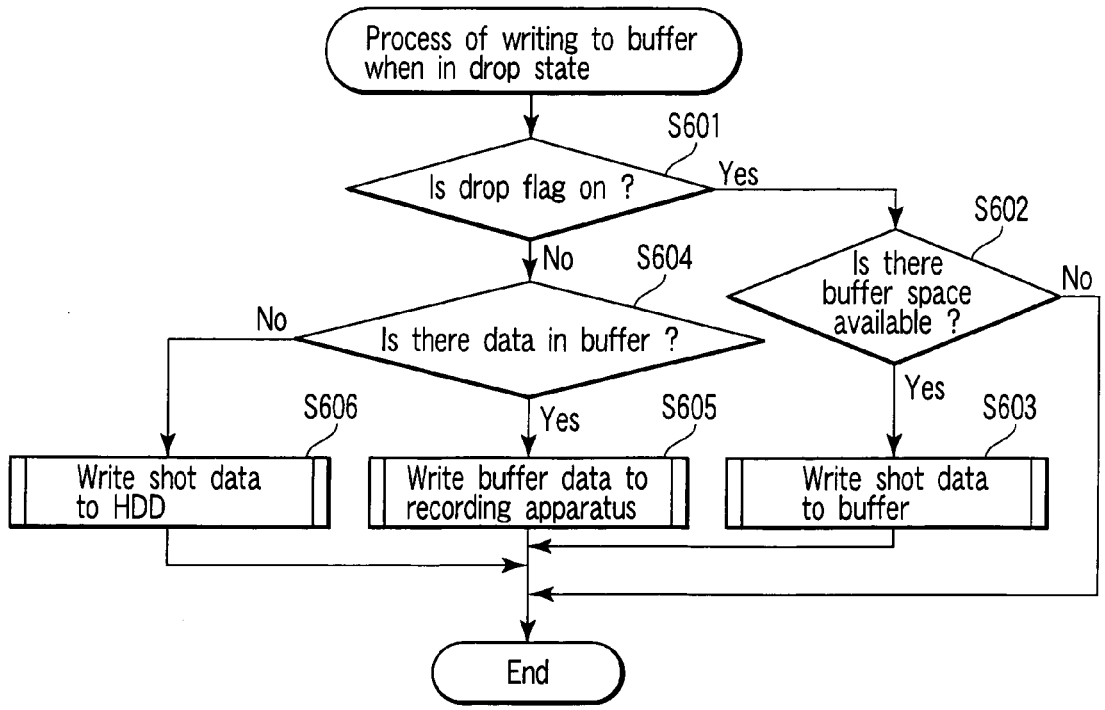
Figure 10:
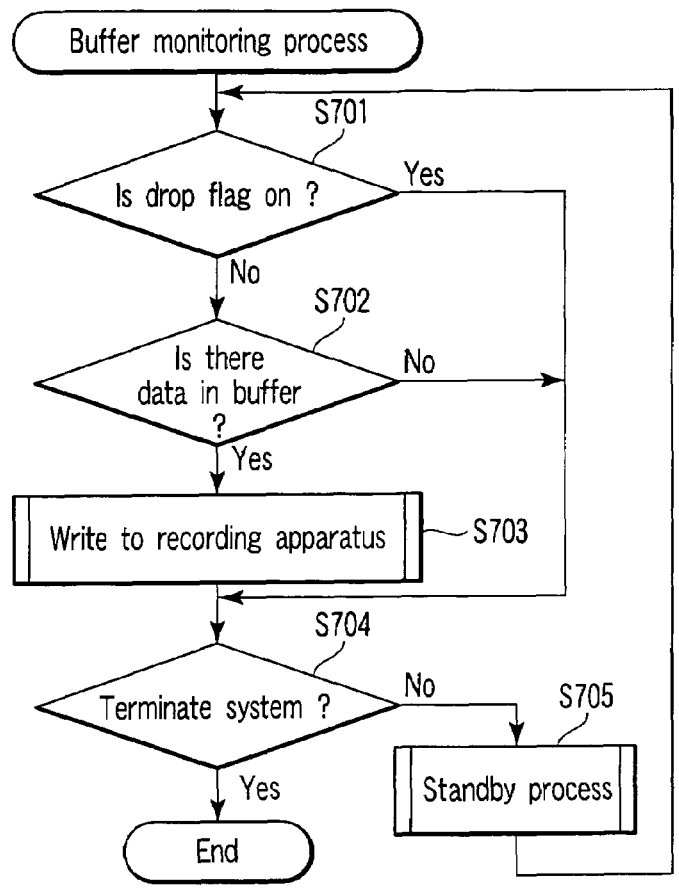
FIG. 10 is flowchart showing a buffer monitoring process.

When, in the process of FIG. 9, shot data is written to the buffer as shown in step S603 and a shooting operation is completed, the shot data remains stored in the buffer. In the present embodiment, data stored in the buffer in such a manner is always monitored and is written to the recording apparatus when the apparatus is in a standby state. FIG. 10 is a flowchart showing such a buffer monitoring process. The buffer monitoring process is processed by an independent task.

The CPU 114 checks the state of the drop flag (S701), and if the drop flag is OFF ("NO" in S701), the CPU 114 checks whether or not there is data in the buffer (S702). If there is data in the buffer, the CPU 114 writes shot data stored in the buffer to the recording apparatus (S703). If the drop flag is ON ("YES" in S701), the CPU 114 does not perform a write process. When a system termination process is performed (when the power is turned off), the CPU 114 ends the task. If the system continues in use ("NO" in S704), the CPU 114 sets a waiting time, as shown in step S705, and proceeds to step S701 and checks the buffer again.

As described above, a component that requires access control upon occurrence of access to the recording apparatus is, in the case of a camera having the configuration of FIG. 1, only the HDD 105 which is structurally susceptible to impact. There is no need to perform access control on the memory card 106. As such, assume that there are, as recording apparatuses, a memory card or the like in addition to a HDD. If all the recording apparatuses are forbidden from being accessed when a drop is determined, usability is degraded. Hence, in the present embodiment, only the HDD is forbidden from being accessed and access to the memory card is not restricted, whereby convenience improves.

Figure 11:
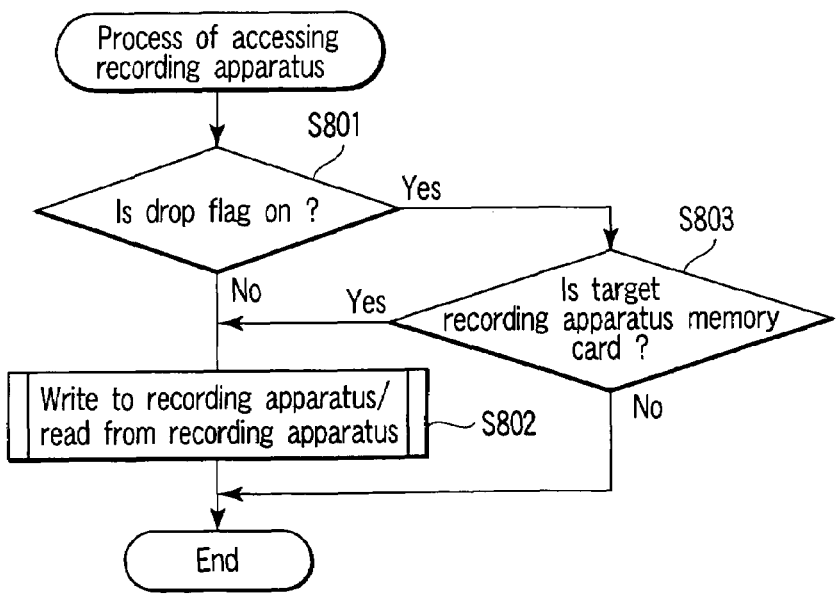
FIG. 11 is a flowchart showing a process of performing access control according to a recording apparatus.

FIG. 11 is a flowchart showing a process of performing access control according to a recording apparatus. When access to a recording apparatus occurs, the CPU 114 determines the state of the drop flag (S801). When the drop flag is ON, the CPU 114 makes a determination on an access target (S803). If the access target is the memory card, the CPU 114 accesses the recording apparatus (S802). If the access target is the HDD ("NO" in S803), the CPU 114 does not access the recording apparatus. If the drop flag is OFF ("NO" in S801), the CPU 114 accesses the recording apparatus without making a determination on the access target (S802).

As described above, according to the embodiments of the present invention, it is possible to prevent a recording apparatus, such as a HDD, from being damaged and stored data from being lost when an apparatus is dropped. In addition, after the apparatus is dropped, the apparatus can be promptly returned to an operation state before the drop.

The aforementioned description is of embodiments of the present invention and does not limit the apparatus and method of the invention and thus various variants can be easily implemented. For example, it is apparent that the invention can be applied not only to a HDD but also to an apparatus having an optical disk drive. In addition, the invention also includes apparatuses or methods that are configured by appropriately combining the components, functions, features, or method steps in the embodiments.

What is claimed is:

1. A recording apparatus comprising:
   a recording unit which records image data obtained by an image pickup operation;
   a drop sensor which detects gravity, and outputs a signal indicating detection of a drop when the gravity is close to zero gravity, and a signal indicating non-detection of a drop when the gravity is normal;
   a determination unit which determines that the apparatus is dropping, when the drop sensor indicates continuous detection of a drop for a first predetermined period, and that the apparatus is not dropping, when the drop sensor indicates continuous non-detection of a drop for a second predetermined period; and
   an access control unit which forbids access to the recording unit for recording or reading when the apparatus is determined by the determination unit to be dropping, and allows the access when the apparatus is determined not to be dropping,
   wherein when, after the drop sensor indicates non-detection of a drop and before the second predetermined period of time has elapsed, the drop sensor indicates detection of a drop and indicates, immediately after that, non-detection of a drop again, the determination unit determines, before a state indicating the non-detection of a drop again continues for the second predetermined period of time, that the apparatus is not dropping.

2. The recording apparatus according to claim 1, further comprising:
   a buffer unit composed of a semiconductor memory;
   a unit which records the image data obtained by the image pickup unit in the buffer unit when the apparatus is determined by the determination unit to be dropping; and
   a unit which records the image data stored in the buffer in the recording unit when the apparatus is determined by the determination unit not to be dropping.

3. The recording apparatus according to claim 1, further comprising a card slot to connect a memory card which records the image data to the apparatus; and a HDD, only the HDD being forbidden from being accessed when the apparatus is determined to be dropping.

* * * * *